Figure 1:
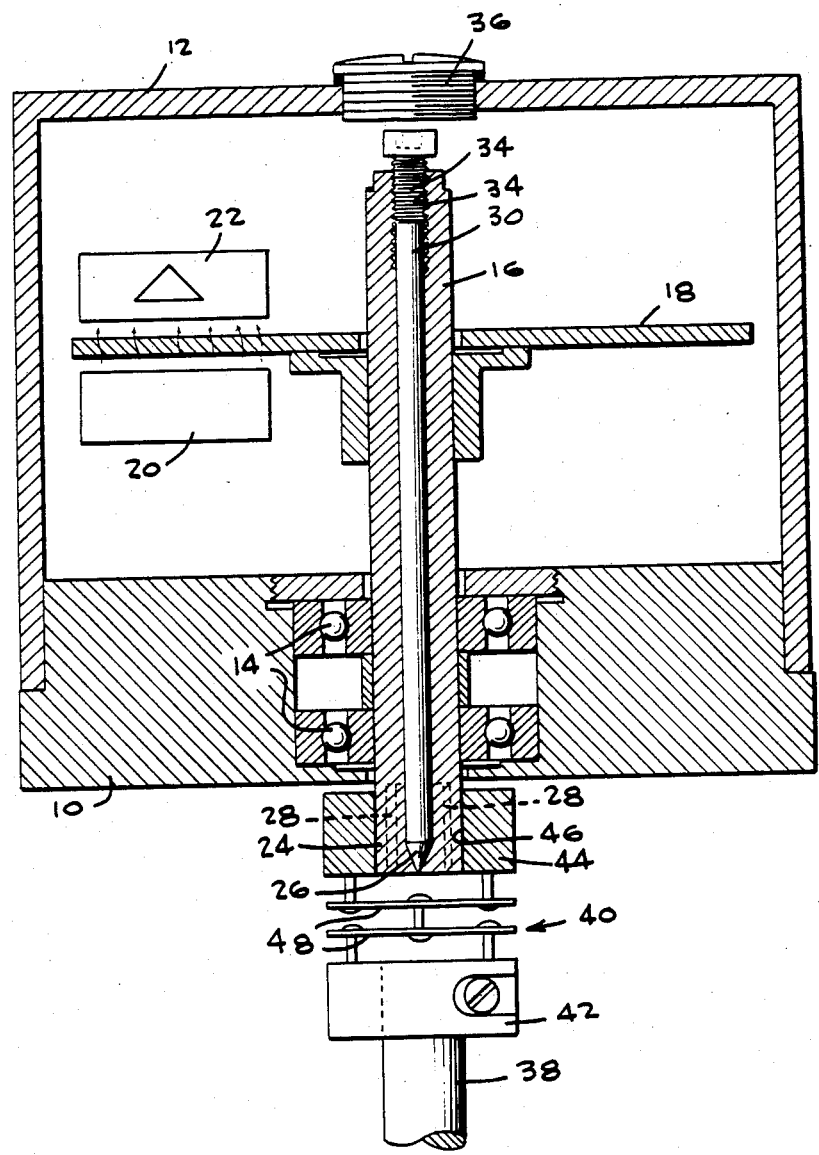

United States Patent [19]

Siraky et al.

[11] Patent Number: 4,652,748
[45] Date of Patent: Mar. 24, 1987

[54] ADJUSTING DEVICE FOR ANGLE STEP INDICATOR

[75] Inventors: Josef Siraky, Donaueschingen; Bernd Häffner, Bad Dürrheim, both of Fed. Rep. of Germany

[73] Assignee: Max Stegmann GmbH Uhren- und Elektroapparatefabrik, Fed. Rep. of Germany

[21] Appl. No.: 756,700

[22] Filed: Jul. 18, 1985

[30] Foreign Application Priority Data

Jul. 27, 1984 [DE] Fed. Rep. of Germany ....... 3427709

[51] Int. Cl.$^4$ .............................................. G01D 5/34
[52] U.S. Cl. .............................................. 250/231 SE
[58] Field of Search ............. 250/231 SE, 237 G, 239;
340/347 P, 347 M; 356/395; 403/248, 277, 290

[56] References Cited

U.S. PATENT DOCUMENTS

| 3,924,978 | 12/1975 | Loyd, Jr. et al. | 403/290 |
| 4,095,914 | 6/1978 | Thomsen | 403/290 |
| 4,326,128 | 4/1982 | Klein | 250/237 G |

Primary Examiner—Edward P. Westin
Assistant Examiner—Stephone B. Allen
Attorney, Agent, or Firm—Irvin A. Lavine

[57] ABSTRACT

In an angle step indicator, a positive connection for adjustment is provided between the input shaft of the angle step indicator and the drive shaft whose angular position is to be measured. The positive connection is created by a shaft end with an adjustable diameter. Preferably, the shaft end is spreadable by means of a spreading pin to generate the positive connection, whereby the spreading pin is accessible from its rear even when the angle step indicator is installed. An elastic angularly fixed connecting element takes up alignment tolerances between the input shaft and the drive shaft.

18 Claims, 2 Drawing Figures

ADJUSTING DEVICE FOR ANGLE STEP INDICATOR

The invention relates to an adjusting device for angle step indicators with an input shaft, with at least one angle-measuring element rotatably connected with the input shaft, and with an elastic angularly rigid connecting element inserted between the input shaft and a drive shaft whose angular position is to be measured.

Angle step indicators are used as analog-digital converters, especially for electrical measurement of angles. They are frequently used to determine the angular positions of shafts, for example on machine tools or on automatic handling machinery.

In incremental angle step indicators, the angle-measuring element, for example a lined disk, generates electrical impulses as the input shaft rotates at equal angular intervals. Counting these pulses measures the current angular position of the angle step indicator. In general, a zero-point mark is provided on the angle-measuring element, and appears once per rotation. This zero-point mark resets the counter connected thereto to zero, thus determining the zero point of the angular position of the drive shaft to be measured. In incremental angle step indicators the zero point of the angular position of the drive shaft must be reset at each startup, because the angle step indicator can be rotated when the system is shut off. In addition, noise pulses can disturb the counting results and hence the angle measurement.

In absolute angle step indicators, the angle-measuring element, for example a disk or drum, shows the angular positions in coded form. The coded angle values are scanned mechanically, magnetically, or optically. The code gives the angular position of the input shaft in absolute terms, so that no disturbance caused by a failure of the electronics, rotation of the angle step indicator with the electronics shut off, or noise pulses, is possible. In the absolute angle step indicator, the zero point of the angle-measuring element need only be aligned with the zero point of the angle position of the drive shaft to be measured.

In known angle step indicators, the angle-measuring element, for example the code disk of an absolute angle step indicator, is fastened to the input shaft either permanently or with the aid of a slip clutch (German Pat. No. 244 48 239). To adjust the zero point, in the former case the connection between the input shaft of the angle step indicator and the drive shaft to be measured must be released or, in the second case, the code disk must be rotated relative to the input shaft with the breakaway torque of the incorporated slip clutch being overcome with the aid of a special tool. In the former case, a difficult, time-consuming process is required, which is unfeasible in practice in high-resolution angle step indicators. In the second case, the built-in friction clutch does facilitate the adjustment process, but the friction clutch can slip at high angular accelerations, so that the adjustment is lost if the breakaway torque or frictional torque of the friction clutch is low. On the other hand, when the frictional torque of the slip clutch is high, problems arise because the connecting element between the input shaft and the drive shaft must overcome at least this breakaway torque without damage.

The goal of the invention is to provide an adjusting device for angle step indicators, which permits simple, rapid zero-point adjustment of the installed angle step indicator without a torque developing on the connecting element between the input shaft and the drive shaft to be measured during the adjustment process.

This goal is achieved according to the invention in an adjusting device of the species recited hereinabove by providing a positive connection by means of a shaft end with an adjustable diameter between the input shaft and the drive shaft.

The positive connection between the input shaft and the angle step indicator and the drive shaft to be measured by means of a shaft end with an adjustable diameter has the advantage that an exclusively radial motion is provided to generate the positive connection. The input shaft of the indicator with the angle-measuring system connected to this input shaft can be aligned exactly with the zero point of the drive shaft for zero-point adjustment with the positive connection released. Then the diameter of the adjustable shaft end is adjusted to create the positive connection between the drive shaft and the input shaft. Since only movements radially to these shafts occur, no rotational torque which has a disadvantageous effect on the exact zero-point adjustment can occur when the positive connection is created. The practically zero-resistance free rotatability of the input shaft with the positive connection released and the creation of a positive connection without the occurrence of a rotary torque make the adjusting device especially suitable for sensitive high-resolution angle step indicators.

The creation of a positive connection by changing the diameter of a shaft end is advantageously accomplished by making this shaft end as a hollow shaft end, insertable into a blind hole, and threadable in the blind hole to create the positive connection. The spreading can advantageously be accomplished by the hollow shaft end having an inner cone and axial slots so that it can be pressed apart by a coaxial spreading pin. This design also permits an especially simple adjustment with the angle step indicator mounted. The shaft, with the spreadable hollow shaft end, is designed as a through hollow shaft and the spreading pin is guided coaxially through this hollow shaft. The spreading pin can be displaced axially by means of a thread in the hollow shaft. The spreading pin can be displaced axially from the freely accessible end opposite the drive shaft by means of a screw to loosen or positively tension the spreadable hollow shaft end.

Other designs are also possible for a shaft end with an adjustable diameter to generate a positive connection. The shaft end, for example, can also be made in the form of a hollow shaft end into which a pin is inserted coaxially. In this case, the diameter of the hollow shaft end is reduced, for example by means of a union nut in the manner of a chuck to create the positive connection.

In a design which is especially simple in construction, the hollow shaft end is the end of the input shaft of the angle step indicator which faces the drive shaft. Preferably, the input shaft in this case is designed as a hollow shaft so that the spreading pin is guided coaxially through the input shaft. The elastic angularly rigid connecting element in this case in inserted between the input shaft and the drive shaft and fastened to the drive shaft. The spreadable hollow shaft end of the input shaft is inserted into a bore in the connecting element.

In another embodiment, the input shaft of the angle step indicator is designed as a tube through which a coaxial coupling shaft is guided freely. The coupling shaft is provided with the spreadable shaft end which is inserted into a blind hole in the drive shaft. The spreading pin is guided coaxially through the coupling shaft. The elastic connecting element, which can handle tolerances in axial alignment between the drive shaft and the input shaft when the angle step indicator is installed can be disposed in this embodiment on the end opposite the drive shaft and connects the coupling shaft which is frictionally rigidly connected to the drive shaft with the input shaft. Since the connecting element is not disposed axially between the input and drive shafts, the axial length of the mounted angle step indicator is reduced.

In the following, the invention is described in greater detail with reference to the embodiments shown in the drawing.

Figure 2:
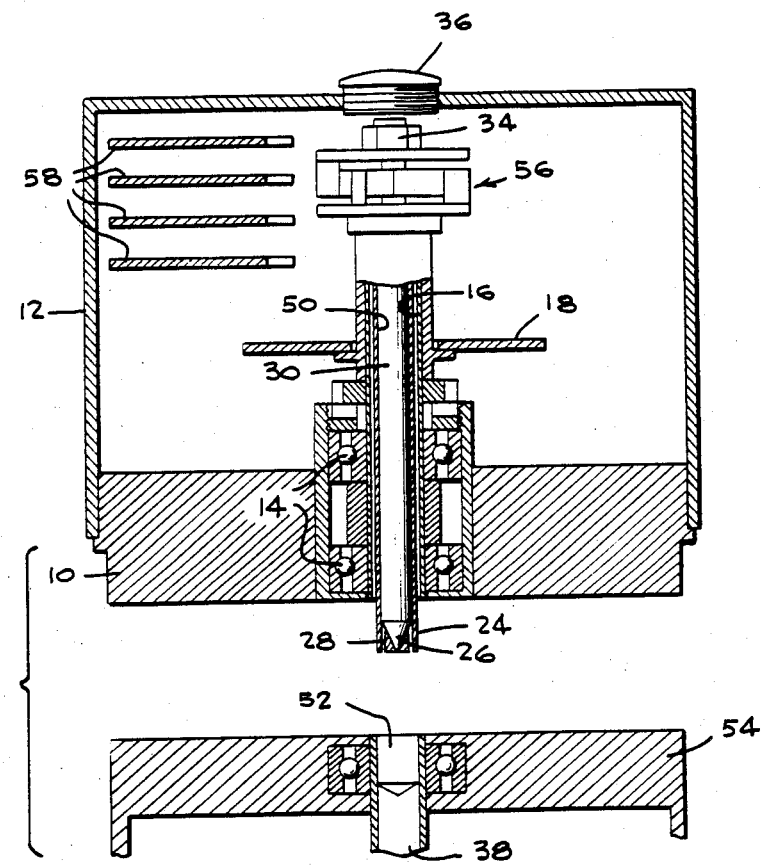

FIG. 1 is a first embodiment of an angle step indicator in axial
cross section, and FIG. 2 is a second embodiment of the angle step indicator in axial
cross section.

The absolute angle step indicator shown in FIG. 1 comprises a base plate 10 and a cover 12 mounted thereon. An input shaft 16 is rotatably mounted in base plate 10 by means of ball bearings 14. A code disk 18 which, in known fashion, is provided with angle values in a plurality of code tracks, is nonrotatably mounted as an angle-measuring element on input shaft 16. Code disk 18 is optically scanned in known fashion by light sources 20 and photoelectric receivers 22.

Input shaft 16 is designed as a hollow shaft with an inner bore passing coaxially therethrough. At the shaft end 24 of input shaft 16 which is brought out through base plate 10, the inner bore tapers conically toward the end of input shaft 16, as indicated by 26. Shaft end 24 has axial slots 28 extending from its axial end.

A spreading pin 30 is inserted into the inner bore of input shaft 16, said pin passing through the entire input shaft 16 and abutting the inner cone 26 of shaft end 24 with a conical tip. At the end opposite shaft end 24, the inner bore of input shaft 16 is provided with a thread 32 in which a screw 34 is engaged. When screw 34 is screwed into input shaft 16, spreading pin 30 is displaced axially forward, so that its tip which engage inner cone 26 spreads shaft end 24 apart. When screw 34 is screwed out of input shaft 16, spreading pin 30 is pushed back axially by the elasticity of shaft end 24 and the action of inner cone 26 so that shaft end 24 again assumes its original shape in which its outside diameter corresponds to the outside diameter of input shaft 16.

Screw 34 is accessible through an opening in the rear wall of cover 12, said opening being sealed by a plug 36.

To mount the angle step indicator on a drive shaft 38, whose angular position is to be measured, a connecting element 40 is mounted on drive shaft 38. Connecting element 40 is nonrotatably fastened by means of a clip 42 to drive shaft 38. A bushing 44 with an inner bore 46 is so connected to clip 42 that a mutual tilting of the axes of clip 42 and bushing 44 is possible to a certain extent but mutual angular rotation of clip 42 and bushing 44 is not possible. Two circular washers 48 are provided for this purpose, connected together at two diametral points, and each connected with clip 42 or bushing 44 at two diametral points located at 90° thereto. Connecting element 40 is known.

Shaft end 24 of input shaft 16 is inserted into inner bore 46 of connecting element 40 and positively nonrotatably attached to the connecting element by spreading by means of spreading pin 30. Connecting element 40 thereby creates a nonrotatable connection between drive shaft 38 and input shaft 16, but permits a certain tolerance in the flush mutual alignment of the axes of drive shaft 48 and input shaft 16 during assembly.

FIG. 2 shows a second embodiment of an absolute angle step indicator. To the extent that this second embodiment corresponds to the embodiment shown in FIG. 1, the same reference numbers are used and reference is made to the description above.

In the embodiment shown in FIG. 2, the input shaft 16 of the angle step indicator is designed as a tube. A coupling shaft 50 is disposed coaxially in input shaft 16, the diameter of said coupling shaft 50 being slightly smaller than the inside diameter of tubular input shaft 16. Coupling shaft 50 is therefore freely movable in input shaft 16, so that a mutual tilting of the axes of input shaft 16 and coupling shaft 50 is possible to a certain degree.

Input shaft 16 fits flush up against the end of the base plate which faces drive shaft 38. Coupling shaft 50, designed as a hollow shaft, on the other hand, has one shaft end 24 projecting beyond base plate 10. Shaft end 24 has an inner cone 26 and axial slots 28 as described above. A spreading pin 30 is inserted coaxially into hollow coupling shaft 50 in the manner described above, said pin being axially displaceable by means of a screw 34 screwable into an inner thread of the rear end of coupling shaft 50.

Shaft end 24 of coupling shaft 50 is inserted into a blind hole 52 in drive shaft 38. By spreading shaft end 24 using spreading pin 30, coupling shaft 50 and drive shaft 38 are nonrotatably and positively connected together. Base plate 10 can then be mounted directly adjacent to a mounting surface 54.

Coupling shaft 50 and input shaft 16 are connected together by a connecting element 56 at the end opposite shaft end 24. Connecting element 56 permits a slight mutual tilting of the axes of input shaft 16 and coupling shaft 50, but does not permit any mutual rotation of input shaft 16 and coupling shaft 50. Coupling element 56 therefore allows a nonrotatable connection between input shaft 16 and coupling shaft 50 and/or drive shaft 38 and takes up minor tolerance variations in the alignment of the axes of drive shaft 38 and input shaft 16. Connecting element 56 is known of itself and described for example in U.S. Pat. No. 4,282,723 and German OS 30 38 072.

Since, in the second embodiment in FIG. 2, base plate 10 can be mounted directly on mounting surface 54, there is a reduced axial total dimension relative to the embodiment shown in FIG. 1, wherein connecting element 40 is located between base plate 10 and mounting surface 54. Connecting element 56 in the embodiment shown in FIG. 2 does not extend the axial structural dimensions since connecting element 56 can be disposed in the area of cover 12, which is required in any case to hold boards 58 for the electronics.

In both embodiments, the angle step indicator can be adjusted when installed. For this purpose, spreading pin 30 is backed off so that it no longer spreads shaft end 24. Input shaft 16 can be rotated without force against connecting element 40 (FIG. 1) or drive shaft 38 (FIG. 2) until the zero point of code disk 18 coincides with the zero angle position on drive shaft 38. In this position, input shaft 16 is locked and spreading pin 30 screwed in again so that shaft end 24 is positively tightened in connecting element 40 or drive shaft 38. Since only the circumference of shaft end 24 is expanded when spreading pin 30 is screwed in, there is no danger that input shaft 16 will rotate relative to drive shaft 38, having a disadvantageous effect on adjustment.

It is readily apparent that the spreading of shaft end 24 can also be accomplished by making the inside diameter of shaft end 24 expand conically toward its end and for spreading pin 30 to have a thickened end abutting this control expansion, whereby the spreading pin is retracted to spread shaft end 24 apart.

We claim:

1. An angle step indicator having angular adjustment between a drive shaft and an input shaft comprising:
   (a) an input shaft having at least one angle-measuring element non-rotatably connected thereto,
   (b) a drive shaft, and
   (c) means for selectively coupling and decoupling said input shaft to enable angular adjustment comprising:
      (i) a male member,
      (ii) a female member in outward surrounding relationship thereto,
      (iii) at least one of said members having a variable diameter, and
      (iv) means for selectively causing the variable diameter member to engage said other member by changing the diameter thereof.

2. The angle step indicator of claim 1, wherein said male member is the variable diameter member.

3. The angle step indicator of claim 2, said male member being an end part of said input shaft.

4. The angle step indicator of claim 2, wherein said input shaft is said male member, is hollow and has axial slots and an inner cone at an end part thereof, and said means for changing the diameter of said male member comprises an axially movable pin engageable with said inner cone for changing the diameter of said end part of said input shaft.

5. The angle step indicator of claim 1, wherein said male member is hollow and said means for changing the diameter thereof comprises a pin.

6. The angle step indicator of claim 5, said hollow male member having axial slots therein and an inner cone, and said pin has a conical end engageable with said inner cone.

7. The angle step indicator of claim 5, said male member being an end part of said input shaft, said input shaft being hollow, said pin extending in the hollow of said input shaft, and said means for changing the diameter of said end part of said input shaft further comprising a screw.

8. The angle step indicator of claim 7, said screw being at the other end of said input shaft.

9. The angle step indicator of claim 1, said male member being the variable diameter member, and further comprising a connecting element, means for securing a portion of said connecting element for non-rotational movement of said drive shaft, said female member being a part of said connecting element.

10. The angle step indicator of claim 9, said connecting element comprising means for permitting axial non-alignment of said input shaft and said drive shaft.

11. The angle step indicator of claim 10, said connecting element further comprising a pair of generally parallel planar elements in spaced relationship, and means connecting said elements non-rotatably together.

12. The angle step indicator of claim 1, said male member being the variable diameter member, means for non-rotatably connecting said male member to said input shaft, said drive shaft comprising said female member.

13. The angle step indicator of claim 12, said input shaft being hollow, said male member being an end part of a hollow coupling shaft extending in and generally axially of said input shaft.

14. The angle step indicator of claim 13, and further including a base plate for supporting said input shaft, said coupling shaft extending outwardly of said base plate.

15. The angle step indicator of claim 13, said coupling shaft being slightly smaller than the inside diameter of the input shaft, whereby to permit mutual axial tilting thereof.

16. The angle step indicator of claim 13, said end part of said hollow shaft having axial slots and an inner cone, said means for changing the diameter of said end part comprising an axially extending pin in said coupling shaft.

17. The angle step indicator of claim 16, and said means for changing the diameter of said end part further comprising a screw.

18. The angle step indicator of claim 17, said screw being at the other end of the coupling shaft.

* * * * *